3,297,772
ALKYLATION PROCESS

Byron W. Turnquest, Chicago, Ill., assignor to Sinclair Research, Inc., New York, N.Y., a corporation of Delaware
No Drawing. Filed Oct. 18, 1963, Ser. No. 317,155
4 Claims. (Cl. 260—658)

This invention is directed to the alkylation of alkylatable hydrocarbons with alkyl monohalides while employing a novel catalyst for the reaction.

The condensation of alkylatable materials such as olefins or aromatics, with alkyl halides in the presence of a condensation catalyst such as metal halide catalysts of the Friedel-Crafts type to produce higher boiling alkyl halides is a reaction well known in the art. Unfortunately, condensation reactions employing the popular Friedel-Crafts type of metal halides such as aluminum chloride suffer disadvantages, e.g., an induction period exists before the condensation reaction begins and the physical state of these catalysts is generally solid which makes metering of the catalyst to a reaction difficult.

It has now been discovered that conducting the alkylation reaction in the presence of an aluminum trilower alkyl catalyst, wherein the lower alkyl groups are usually of up to about 7 carbon atoms, preferably 1 to 4 carbon atoms, avoids the aforementioned disadvantages. The alkyl substituents in a given catalyst can be the same or different. That the novel catalysts of this invention effect an immediate reaction of the alkylatable hydrocarbon with the alkyl halide in contrast to the sluggishly starting reaction obtained, for instance, when aluminum chloride is employed as the catalyst, is particularly surprising in that the aluminum trialkyl catalysts of the invention are known to be inactive in other condensation reactions such as the alkylation of olefins with isoparaffins.

The catalyst of the present invention can be prepared by any of the methods familiar to the art. For instance, trialkylaluminum can be prepared from $AlCl_3$ and the Grignard reagent $RM_gX$, which reaction can be illustrated as follows:

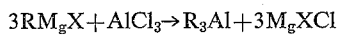

The novel catalytic materials can be used as such or if desired, they can be disposed on solid inert carriers or supports such as alumina, activated charcoal, crushed porcelain, acid-treated clays, diatomaceous earth, pumice firebrick, etc.

The alkyl halide reactant of the invention can be any of the alkyl monohalides of at least 2 carbon atoms utilized as alkylating agents in condensation reactions with alkylatable hydrocarbons such as monoolefins or aromatics. Thus, the alkyl halide reactant can be a primary, secondary or tertiary alkyl monohalide of up to about 10 or more carbon atoms, including the monohalocycloalkanes. In general, the tertiary halides are more reactive than the secondary halides which in turn are more reactive than the primary halides. The halogen atoms can be chlorine, bromine, iodine or fluorine, but the preferred halides are those whose halogen has an atomic number of 17–35, i.e., the chlorides and bromides.

Suitable primary alkyl monohalides are for example, ethyl, propyl, butyl, isobutyl, pentyl, isopentyl, hexyl, isohexyl, etc., chloride or bromide. Illustrative of the secondary alkyl monohalides are 2-chloro or bromo propane, butane, pentane and hexane; 3-chloro or bromo pentane, hexane, etc. Examples of tertiary monohalides, which are the preferred alkyl halides of the invention, are tertiary butyl and tertiary amyl chloride or bromide, 2-chloro-2-methyl pentane, 3-chloro-3-methyl pentane, 2-bromo-2,3-dimethyl butane, etc., as well as higher homologues such as 2-chloro-2,4,4-trimethyl pentane.

Monohalocyclo-alkanes include monohalocyclopentanes of monohalocyclohexanes, monohalodecalins and other monohalogenated saturated cyclic hydrocarbon compounds. More specific examples of suitable halocycloalkanes are 1-chloro-1-methyl cyclopentane, 1-chloro-1-methylcyclohexane and 9-chlorodecahydronaphthalene.

The alkylatable hydrocarbons reacted with the alkyl halides of the invention include both mono-olefins and aromatics, and are usually of up to about 12 carbon atoms. Suitable mono-olefins which give the corresponding monohaloalkanes comprise the normally gaseous or normally liquid olefinic hydrocarbons of 2 to 12 or more carbon atoms such as ethylene, propylene, alpha and beta butylene, the amylenes, hexylenes and higher homologues; cyclo-olefins such as cyclopentene, cyclohexene, methylcyclohexenes, and cyclohexyl ethylene, etc. and suitable substitution products of such olefins.

Aromatic compounds that can be used in the process of the invention to give the corresponding alkyl-substituted aromatics, are the alkylatable aromatic hydrocarbons. Aromatics suitable for reaction in the present process include mono- and polycyclic aromatic hydrocarbon compounds such as benzene and its alkyl homologues, e.g., toluene and the xylenes, naphthalene, and indane, which may be substituted or unsubstituted. The substituted aromatic compounds must, however, contain at least one hydrogen attached to the aromatic nucleus and are preferably methyl-substituted. These compounds may correspond to the general formula

where R is an alkyl, including cyclo alkyl, radical containing generally from about 1 to 20, preferably from about 1 to 8, carbon atoms; $n$ is 0–5, preferably 1 to 3; R′ forms an aromatic hydrocarbon ring, preferably R′ is $C_4H_4$; —f— indicates a fused ring relationship (two carbon atoms common to two aromatic nuclei, e.g., as in naphthalene); and $m$ is generally 0 to 1 or more. R may also be a divalent hydrocarbon group attached to the aromatic ring at two carbon atoms of the ring, e.g., alkylene, as in decahydronaphthalene and 1,2,3,4-tetrahydronaphthalene. The preferred aromatics, however, include benzene and alkyl benzenes corresponding to the above formula when $m$ is 0. The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethyl-benzene, ortho-ethyltoluene, meta-ethyltoluene, para-ethyltoluene, 1,2,3-trimethylbenzene, 1,2,4-trimethylbenzene, 1,3,5-trimethylbenzene or mesitylene, normal propylbenzene, isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha-methylnaphthalene, beta-methylnaphthalene, anthracene, phenanthrene, naphthacene, rubrene, etc.

The production of higher boiling alkyl monohalides is effected by reacting the lower boiling alkyl monohalide with the alkylatable hydrocarbon in the presence of the aluminum trialkyl catalyst of the present invention at a condensation temperature generally ranging from about −30 to +50° C. The optimum reaction temperature for a particular alkylation or condensation will vary depending upon the alkyl halide and alkylatable hydrocarbon selected. In general, lower temperatures are utilizable with tertiary alkyl halides than with secondary halides which, in turn, are usually more reactive than primary halides. Higher temperatures are usually required with ethylene than with higher molecular weight olefins or the aromatic hydrocarbons. Atmospheric pressures are suitable for the reaction but subatmospheric or superatmospheric pressures can be used, if desired. Superatmospheric pressure may give increased selectivity since they maintain normally gaseous olefin reactants in the liquid phase. The reaction can be carried out either in a batch or continuous operation.

Approximately equal molecular amounts or an excess of either of the alkyl halide or the alkylatable hydrocarbon may be used in the reaction, but it is preferred to effect the reaction by employing at least about 2 moles of the alkylatable hydrocarbon per mole of alkyl halide. Most advantageously, at least about 10, preferably at least about 30 moles of the alkylatable hydrocarbon per mole of the aluminum trialkyl catalyst are provided.

The aluminum trialkyl catalyst is employed in the condensation reaction in amounts sufficient to catalyze the reaction, the amount generally falling in the range of about 0.1 to 5%, preferably about 0.5 to 3%, by weight based on the tertiary alkyl halide. Although unnecessary, an inert diluent or solvent for the catalyst can also be employed, if desired. Suitable inert hydrocarbon diluents include, for instance, alkanes of 3 to 8 carbon atoms such as propane, butane, pentane, hexane, etc.

After reaction the resulting higher molecular weight product which forms as a layer in the reaction mixture, can be separated as by simple decantation and any residual catalyst removed as by washing with water, alcohol, dilute aqueous caustic soda or other suitable hydrolyzing and washing methods as well as adsorption in suitable adsorbents such as activated aluminas and clays. The catalyst separated can be stored for use in a subsequent preparation or, if desired, can be recycled directly to the alkyl halide-alkylatable compound condensation reaction.

The higher molecular weight halides produced in my reaction system are of value as intermediates in the preparation of other valuable polar compounds. For instance, they may be converted into other types of derivatives such as ketones, aldehydes and carboxylic acids. Also, the monohaloalkanes can be dehydrohalogenated to provide olefinic products useful in themselves or as intermediates for the production of other desirable products. For example, 1-halo-3,3-dimethylbutane can be dehydrohalogenated to provide the isoprene precursor, 3,3-dimethylbutene-1.

The following examples are included to further illustrate the present invention.

*Example*

Ethylene was added to a stirred mixture of tertiary butyl chloride and 2% by weight (based on the alkyl chloride) of triisobutylaluminum as a catalyst at a rate of 4 moles of ethylene/mole of tertiary butyl chloride/hr. while maintaining the reaction temperature near 20° F. by external cooling. The induction period, that is, the period wherein little, if any, uptake of ethylene is observed, was noted. After 25 minutes the condensation product layer (neohexyl chloride) was separated and the dissolved catalyst destroyed by water-washing.

For comparison the above experiment was repeated but employing the Friedel-Crafts catalyst, $AlCl_3$. The results of the two runs are shown in the table below.

TABLE

| Run | A | B |
|---|---|---|
| Catalyst | $AlCl_3$ | Triisobutylaluminum. |
| Catalyst Conc., Percent | 2 | 2. |
| Induction Period | 15 min | None. |
| Conv. of t-Butyl Chloride, Percent | 100 | 100. |
| Selectivity to Neohexyl Chloride, Mole Percent | 77 | 77. |

The data demonstrate that the catalyst of the present invention unexpectedly provides an immediate reaction while the $AlCl_3$ catalyst effected a reaction that was slow to start, requiring an induction period of 15 minutes.

I claim:

1. An alkylation process which comprises reacting a mixture consisting essentially of an alkyl monohalide of at least 2 carbon atoms and an alkylatable mono-olefin hydrocarbon of 2 to 12 carbon atoms at a temperature ranging from about −30 to 50° C. in the presence of a catalytic amount of tri(lower alkyl) aluminum.

2. The process of claim 1 wherein the alkyl monohalide is a tertiary alkyl monohalide of up to 10 carbon atoms.

3. The process of claim 2 wherein the monoolefin is ethylene and the tertiary alkyl halide is tertiary butyl chloride.

4. The process of claim 3 wherein the mole ratio of ethylene to tertiary halide is at least about 2:1.

References Cited by the Examiner

UNITED STATES PATENTS

| | | | |
|---|---|---|---|
| 2,388,428 | 11/1945 | Mavity | 260—671 |
| 2,419,500 | 4/1947 | Peterson et al. | 260—658 |
| 2,434,289 | 1/1948 | Schmerling | 260—658 |
| 2,462,384 | 2/1949 | Gorin et al. | 260—671 |
| 2,533,053 | 12/1950 | Schmerling | 260—658 |
| 2,824,145 | 2/1958 | McCall et al. | 260—671 |
| 2,842,605 | 7/1958 | Appell | 260—671 |
| 2,927,086 | 3/1960 | Gordon et al. | 260—671 |

LEON ZITVER, *Primary Examiner.*

K. V. ROCKEY, *Assistant Examiner.*